US012593830B2

(12) United States Patent
Griggs

(10) Patent No.: US 12,593,830 B2
(45) Date of Patent: Apr. 7, 2026

(54) TUNNEL GATES FOR CRAB POTS, CRAB POTS INCLUDING THE SAME, AND RELATED METHOD

(71) Applicant: Griggs & Associates, Inc., Eureka, CA (US)

(72) Inventor: Seth Justin Griggs, Eureka, CA (US)

(73) Assignee: Griggs & Associates, Inc., Eureka, CA (US)

( * ) Notice: Subject to any disclaimer, the term of this patent is extended or adjusted under 35 U.S.C. 154(b) by 65 days.

(21) Appl. No.: 18/757,274

(22) Filed: Jun. 27, 2024

(65) Prior Publication Data

US 2025/0024822 A1 Jan. 23, 2025

Related U.S. Application Data

(60) Provisional application No. 63/514,852, filed on Jul. 21, 2023.

(51) Int. Cl.
*A01K 69/08* (2006.01)

(52) U.S. Cl.
CPC .................................... *A01K 69/08* (2013.01)

(58) Field of Classification Search
CPC ................................................ A01K 69/06–10
See application file for complete search history.

(56) References Cited

U.S. PATENT DOCUMENTS

| | | | | | |
|---|---|---|---|---|---|
| 1,054,880 | A | * | 3/1913 | Svoboda | A01K 69/06 |
| | | | | | 43/105 |
| 1,412,649 | A | * | 4/1922 | Bitonti et al. | A01K 69/08 |
| | | | | | 43/66 |
| 1,422,894 | A | * | 7/1922 | Skubinski | A01M 23/00 |
| | | | | | 43/66 |
| 1,521,474 | A | * | 12/1924 | Potthast | A01K 69/06 |
| | | | | | 43/73 |
| 1,618,513 | A | * | 2/1927 | Coghill | A01M 23/18 |
| | | | | | 43/66 |
| 1,619,366 | A | * | 3/1927 | Petersen | A01M 23/00 |
| | | | | | 43/100 |

(Continued)

FOREIGN PATENT DOCUMENTS

| | | | | | |
|---|---|---|---|---|---|
| GB | | 2241859 A | * | 9/1991 | A01K 69/10 |
| GB | | 2638707 A | * | 9/2025 | A01K 69/06 |

(Continued)

*Primary Examiner* — Morgan T Jordan

(74) *Attorney, Agent, or Firm* — Kolitch Romano Dascenzo Gates LLP

(57) ABSTRACT

Tunnel gates for crab pots, crab pots including the same, and related methods. The tunnel gates include a gate frame that defines an entry opening. The tunnel gates also include a trigger mount, which is positioned within an upper gate region of the tunnel gate, and a plurality of trigger bars, which are pivotally attached to the trigger mount and extend toward a lower gate region of the tunnel gate. The plurality of trigger bars is configured to rotate, relative to the gate frame, about a rotation axis. The tunnel gates also include a trigger stop positioned within the upper gate region. The trigger stop is configured to restrict rotation of the plurality of trigger bars about the rotation axis between an open orientation and a closed orientation. The crab pots include the tunnel gates. The methods include methods of utilizing the tunnel gates.

19 Claims, 8 Drawing Sheets

(56) References Cited

U.S. PATENT DOCUMENTS

| | | | | | |
|---|---|---|---|---|---|
| 1,911,919 | A | * | 5/1933 | Molls | A01M 23/18 |
| | | | | | 43/66 |
| 2,760,297 | A | * | 8/1956 | Buyken | A01K 69/08 |
| | | | | | 43/105 |
| 2,787,082 | A | * | 4/1957 | Paschen | A01M 23/14 |
| | | | | | 43/66 |
| 3,271,894 | A | * | 9/1966 | Manno | A01K 69/08 |
| | | | | | 43/65 |
| 3,795,073 | A | * | 3/1974 | Olsen | A01K 69/10 |
| | | | | | 43/100 |
| 4,184,283 | A | * | 1/1980 | Wyman | A01K 69/08 |
| | | | | | 43/65 |
| 4,214,399 | A | * | 7/1980 | Bradley | A01M 23/08 |
| | | | | | 43/66 |
| 4,221,071 | A | * | 9/1980 | Sjolund | A01K 69/08 |
| | | | | | 43/100 |
| 4,452,005 | A | * | 6/1984 | Poirot | A01K 69/06 |
| | | | | | 43/4.5 |
| 4,819,369 | A | * | 4/1989 | Bodker | A01K 69/08 |
| | | | | | 43/103 |
| 4,843,756 | A | * | 7/1989 | Wyman | A01K 69/06 |
| | | | | | 43/102 |
| 4,905,405 | A | * | 3/1990 | Hendricks | A01K 69/08 |
| | | | | | 43/100 |
| 5,168,653 | A | * | 12/1992 | Wyman | A01K 69/06 |
| | | | | | 43/100 |
| 5,259,809 | A | * | 11/1993 | Rainey, Jr. | A01K 69/06 |
| | | | | | 119/213 |
| 5,478,273 | A | * | 12/1995 | Ives | A01K 69/10 |
| | | | | | 452/1 |
| 5,771,627 | A | * | 6/1998 | Mattson | A01K 69/06 |
| | | | | | 43/100 |
| 5,924,237 | A | * | 7/1999 | Ives | A01K 69/10 |
| | | | | | 43/100 |
| 5,943,812 | A | * | 8/1999 | Pizzolato | A01K 69/06 |
| | | | | | 43/103 |
| 5,946,850 | A | * | 9/1999 | Sarkisyan | A01K 69/06 |
| | | | | | 43/100 |
| 5,974,725 | A | * | 11/1999 | Knight | A01K 69/06 |
| | | | | | 43/66 |
| 6,035,575 | A | * | 3/2000 | Hilty | A01K 69/06 |
| | | | | | 43/100 |
| 6,837,000 | B2 | * | 1/2005 | Renzi | A01M 29/30 |
| | | | | | 160/40 |
| 7,913,448 | B2 | * | 3/2011 | December | A01K 69/06 |
| | | | | | 43/100 |
| 8,117,783 | B2 | * | 2/2012 | Hilty | A01K 69/06 |
| | | | | | 43/100 |
| 2005/0268528 | A1 | * | 12/2005 | Hibbs | A01K 69/10 |
| | | | | | 43/100 |
| 2007/0261292 | A1 | * | 11/2007 | December | A01K 69/06 |
| | | | | | 43/66 |
| 2016/0165863 | A1 | * | 6/2016 | Anderson | A01K 69/08 |
| | | | | | 43/105 |
| 2017/0172122 | A1 | * | 6/2017 | Nguyen | A01M 23/18 |
| 2023/0165228 | A1 | * | 6/2023 | Brighi | A01K 69/06 |
| | | | | | 43/105 |

FOREIGN PATENT DOCUMENTS

| | | | | | |
|---|---|---|---|---|---|
| KR | 20160109486 | A | * | 9/2016 | A01K 69/06 |
| KR | 20190042976 | A | * | 4/2019 | A01K 69/06 |
| KR | 102453604 | B1 | * | 10/2022 | A01K 69/08 |
| WO | WO-0100016 | A1 | * | 1/2001 | A01K 69/10 |

* cited by examiner

TUNNEL GATES FOR CRAB POTS, CRAB POTS INCLUDING THE SAME, AND RELATED METHOD

RELATED APPLICATION

This application claims priority to U.S. Provisional Patent Application No. 63/514,852, which was filed on Jul. 21, 2023, and the complete disclosure of which is hereby incorporated by reference.

FIELD OF THE DISCLOSURE

The present disclosure is directed generally to tunnel gates for crab pots, to crab pots that include the tunnel gates, and to related methods.

BACKGROUND OF THE DISCLOSURE

Crab pots may be utilized to catch or fish for crabs. Crab pots typically include a mesh exterior that at least partially defines, or encloses, a crab-retaining volume, which is configured to receive and retain the crabs. Crab pots also may include a selective, or one-way, entrance into the crab-retaining volume, which may be configured to permit crab entry into the crab-retaining volume and to resist crab egress from the crab-retaining volume. Conventional entrances to conventional crab pots are configured in such a manner that crabs may be frightened and/or otherwise discouraged from passing through the entrance and being captured within the crab-retaining volume. As an example, the crabs may be required to move up an inclined surface in order to pass through a conventional tunnel region and to the entrance of the conventional crab pot. Stated differently, a lower surface of the conventional entrance may be raised relative to a pot floor of the conventional crab pot. As another example, a mechanism via which the entrance restricts crab egress may discourage crabs from passing through the entrance and into the crab-retaining volume. Additionally or alternatively, such conventional entrances may not be durable and/or may be defeated by the crabs, thereby permitting undesired crab egress. Thus, there exists a need for improved tunnel gates for crab pots and/or for improved crab pots that include the improved tunnel gates.

SUMMARY OF THE DISCLOSURE

Tunnel gates for crab pots, crab pots including the same, and related methods are disclosed herein. The tunnel gates include a gate frame that defines an entry opening sized to permit crabs to pass therethrough and enter the crab pot. The tunnel gates also include a trigger mount positioned within an upper frame region of the tunnel gate. The tunnel gates further include a plurality of trigger bars pivotally attached to the trigger mount and extending toward a lower gate region of the tunnel gate. The plurality of trigger bars is configured to rotate, relative to the gate frame, about a rotation axis that extends at least substantially parallel to the entry opening. The tunnel gates also include a trigger stop positioned within the upper gate region. The trigger stop is configured to restrict rotation of the plurality of trigger bars about the rotation axis between an open orientation, which permits entry of the crabs into the crab pot via the entry opening, and a closed orientation, which restricts egress of the crabs from the crab pot via the entry opening.

The crab pots include a pot frame that at least partially bounds a crab-retaining volume and a tunnel region that extends from a tunnel entrance, which is proximate an external periphery of the pot frame, to a tunnel exit, which opens into the crab-retaining volume. The crab pots also include the tunnel gate and further include a mesh material operatively attached to the pot frame such that the mesh material at least partially bounds the crab-retaining volume.

The methods include permitting rotation of the plurality of trigger bars relative to the gate frame and about the rotation axis. The methods also include restricting rotation of the plurality of trigger bars, utilizing a trigger stop of the tunnel gate that is positioned within the upper gate region. The restricting rotation includes restricting rotation between an open orientation, which permits entry of the crabs into the crab pot via the entry opening, and a closed orientation, which restricts egress of the crabs from the crab pot via the entry opening.

DETAILED DESCRIPTION AND BEST MODE OF THE DISCLOSURE

Figure 1:
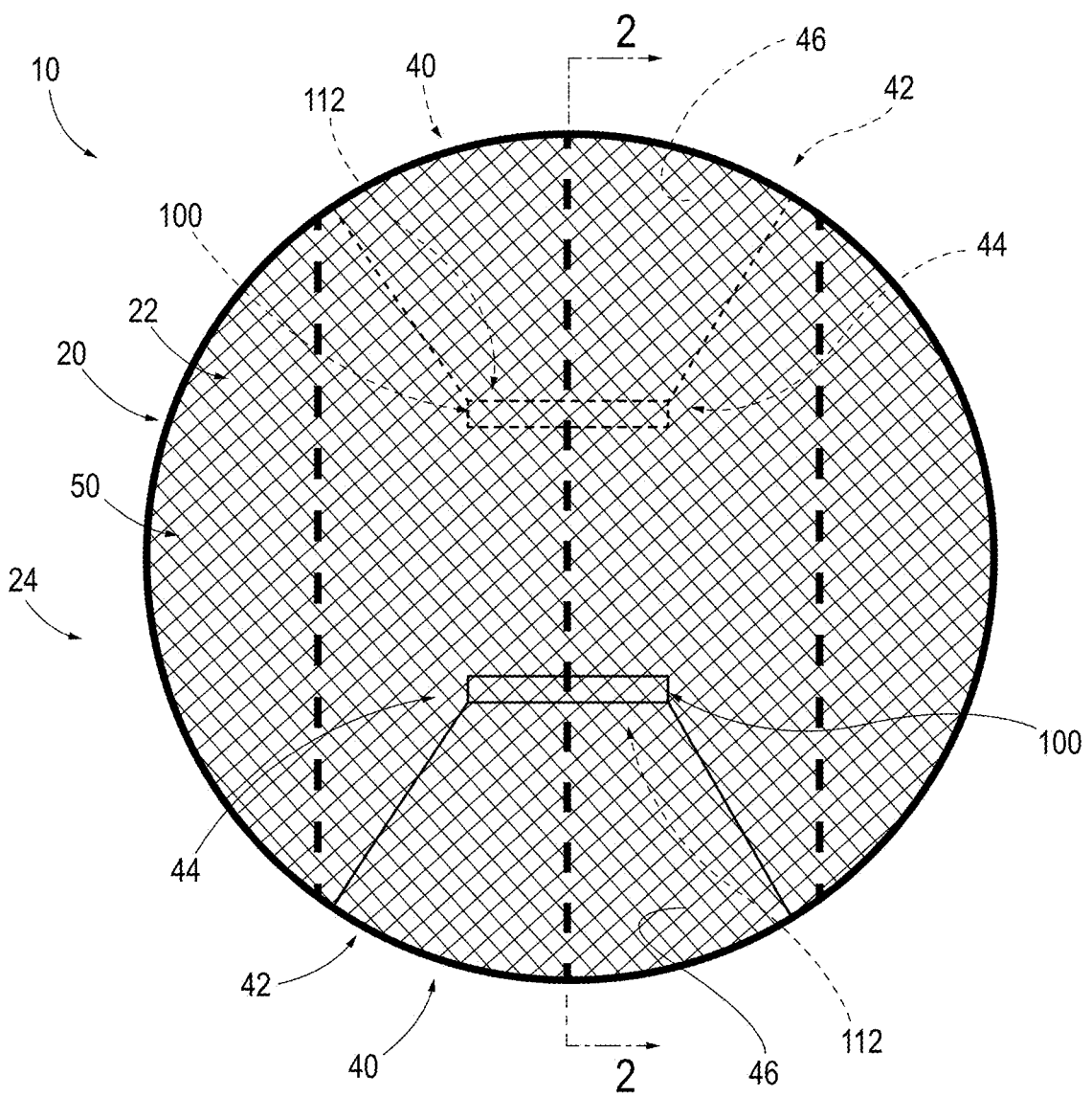
FIG. 1 is a schematic illustration of examples of a crab pot that includes a tunnel gate, according to the present disclosure.

FIGS. 1-8 provide examples of tunnel gates 100, crab pots 10 that include tunnel gates 100, and/or methods 200 according to the present disclosure. Elements that serve a similar, or at least substantially similar, purpose are labeled with like numbers in each of FIGS. 1-8, and these elements may not be discussed in detail herein with reference to each of FIGS. 1-8. Similarly, all elements may not be labeled in each of FIGS. 1-8, but reference numerals associated therewith may be utilized herein for consistency. Elements, components, and/or features that are discussed herein with reference to one or more of FIGS. 1-8 may be included in and/or utilized with any of FIGS. 1-8 without departing from the scope of the present disclosure.

In general, elements that are likely to be included in a particular embodiment are illustrated in solid lines, while elements that are optional are illustrated in dashed lines. However, elements that are shown in solid lines may not be essential to all embodiments and, in some embodiments, may be omitted without departing from the scope of the present disclosure.

FIGS. 1-4 illustrate examples of crab pots 10, according to the present disclosure. In particular, FIG. 1 is a schematic illustration of examples of a crab pot 10 that includes a tunnel gate 100 according to the present disclosure, and FIG.

Figure 2:
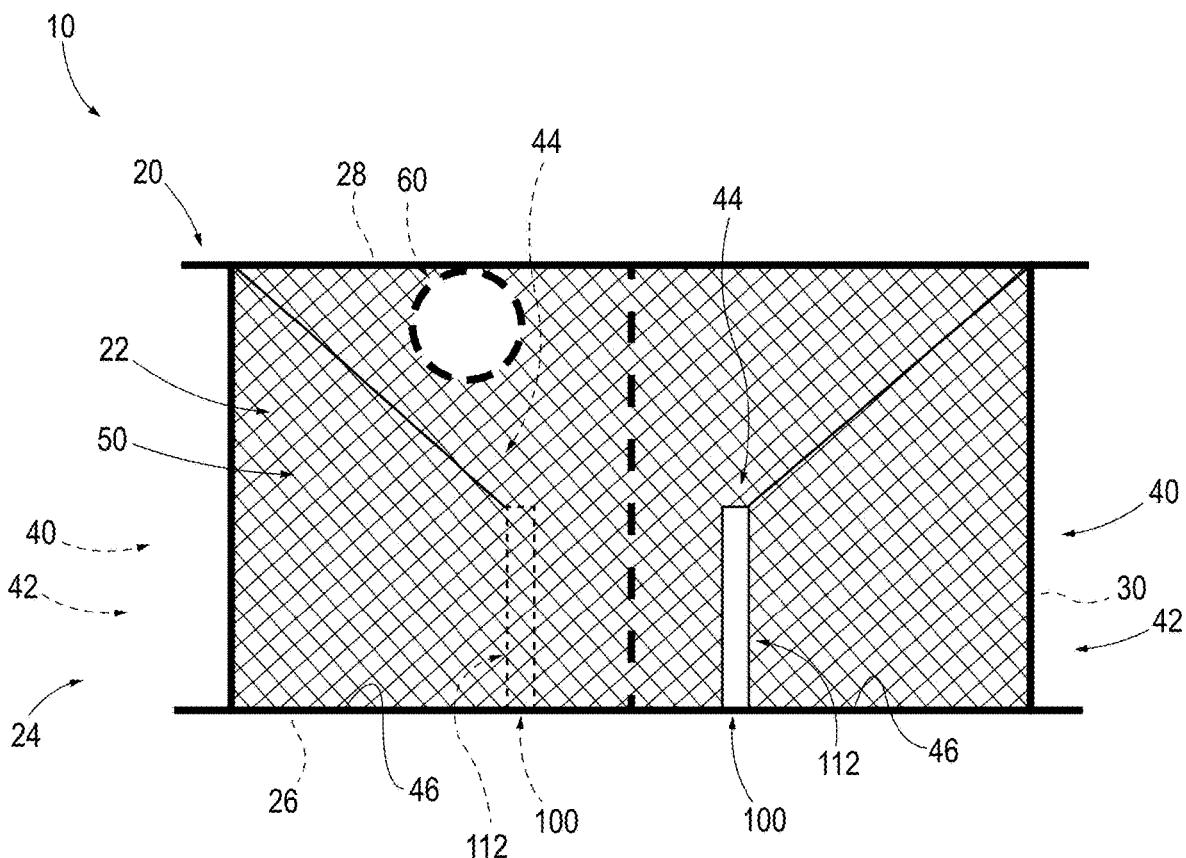
FIG. 2 is a schematic cross-sectional view of the crab pot of FIG. 1 taken along line 2-2 of FIG. 2.
Figure 3:
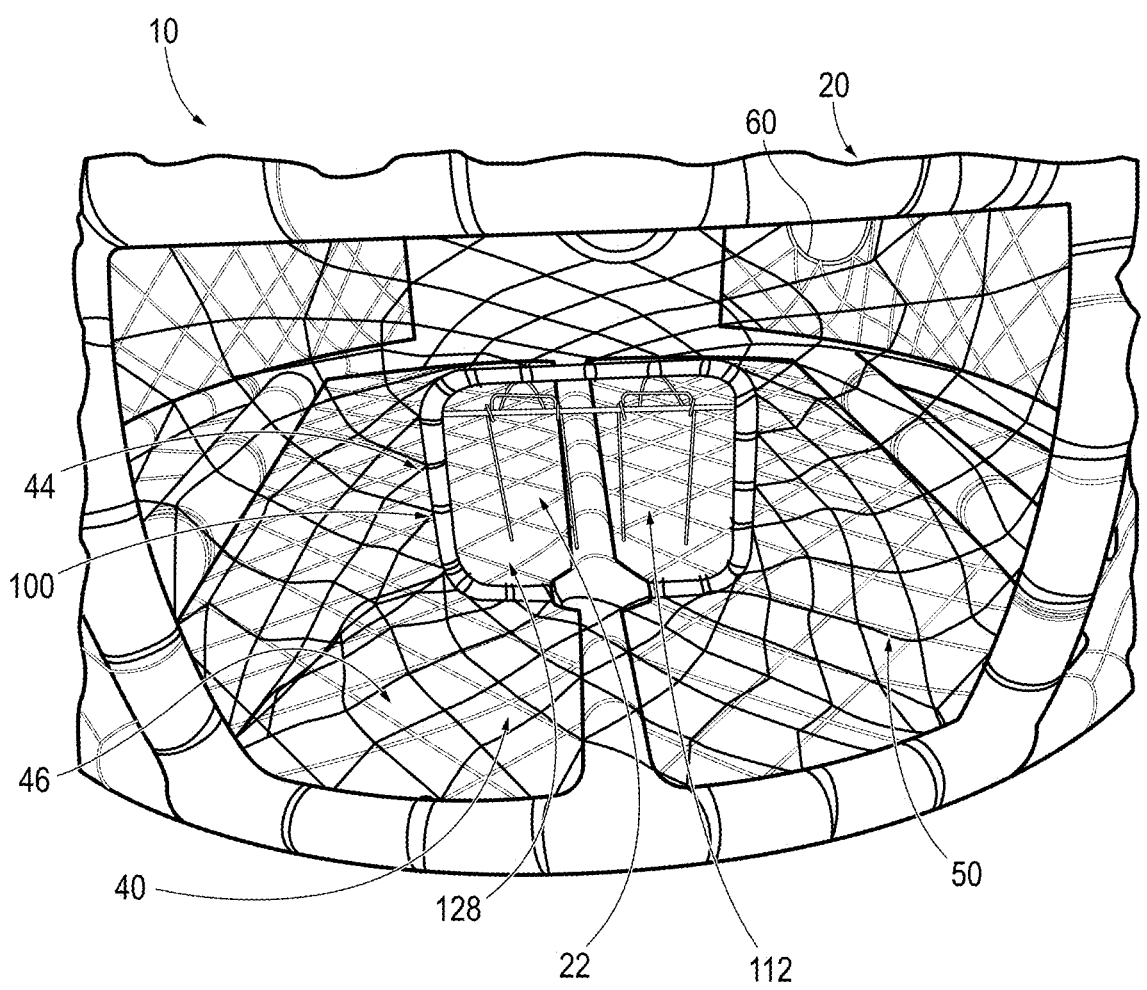
FIG. 3 is a less schematic example of a crab pot that includes a tunnel gate, according to the present disclosure.
Figure 4:
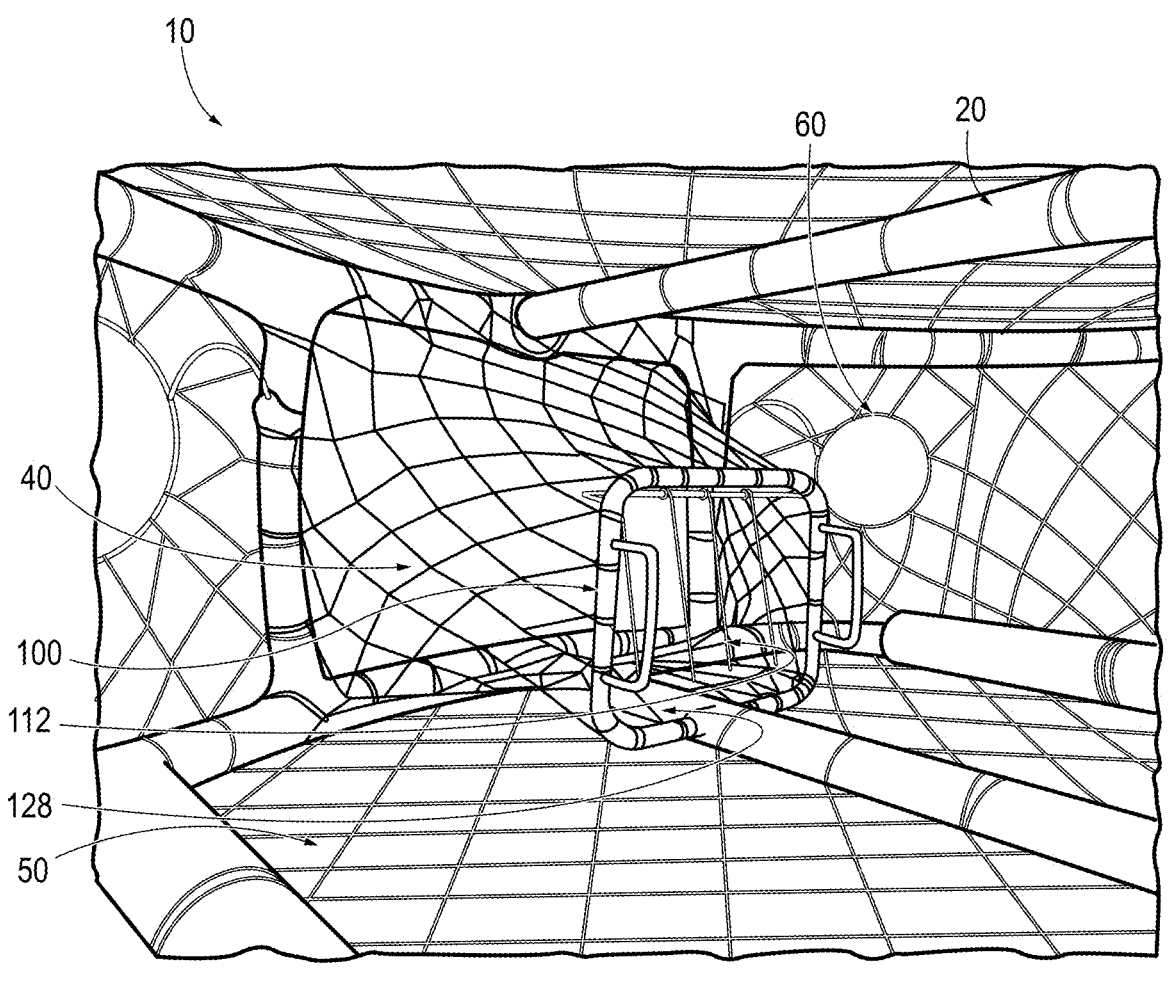
FIG. 4 is another less schematic example of a crab pot that includes a tunnel gate, according to the present disclosure.

2 is a schematic cross-sectional view of the crab pot of FIG. 1 taken along line 2-2 of FIG. 1. FIGS. 3-4 are less schematic examples of crab pot 10 that includes tunnel gate 100. As collectively illustrated by FIGS. 1-4 and with specific reference to FIGS. 1-2, crab pots 10 include a pot frame 20, a tunnel region 40, a mesh material 50, and a tunnel gate 100. In some examples, and as illustrated in dashed lines in FIGS. 1-2, crab pot 10 may include a plurality of tunnel regions 40 and a corresponding plurality of tunnel gates 100.

Pot frame 20 at least partially bounds, surrounds, and/or defines a crab-retaining volume 22, which may be configured to hold, house, and/or contain crabs that enter crab pot 10. Tunnel region 40 extends from a tunnel entrance 42 to a tunnel exit 44. Tunnel entrance 42 is proximate an external periphery 24 of pot frame 20 and/or of crab pot 10, and tunnel exit 44 extends and/or opens into crab-retaining volume 22. Mesh material 50 is operatively attached to pot frame 20 such that the mesh material at least partially bounds, surrounds, and/or defines crab-retaining volume 22. Stated differently, pot frame 20 may support, or define a shape of, mesh material 50, and pot frame 20 and mesh material 50 together may define the crab-retaining volume.

Figure 5:
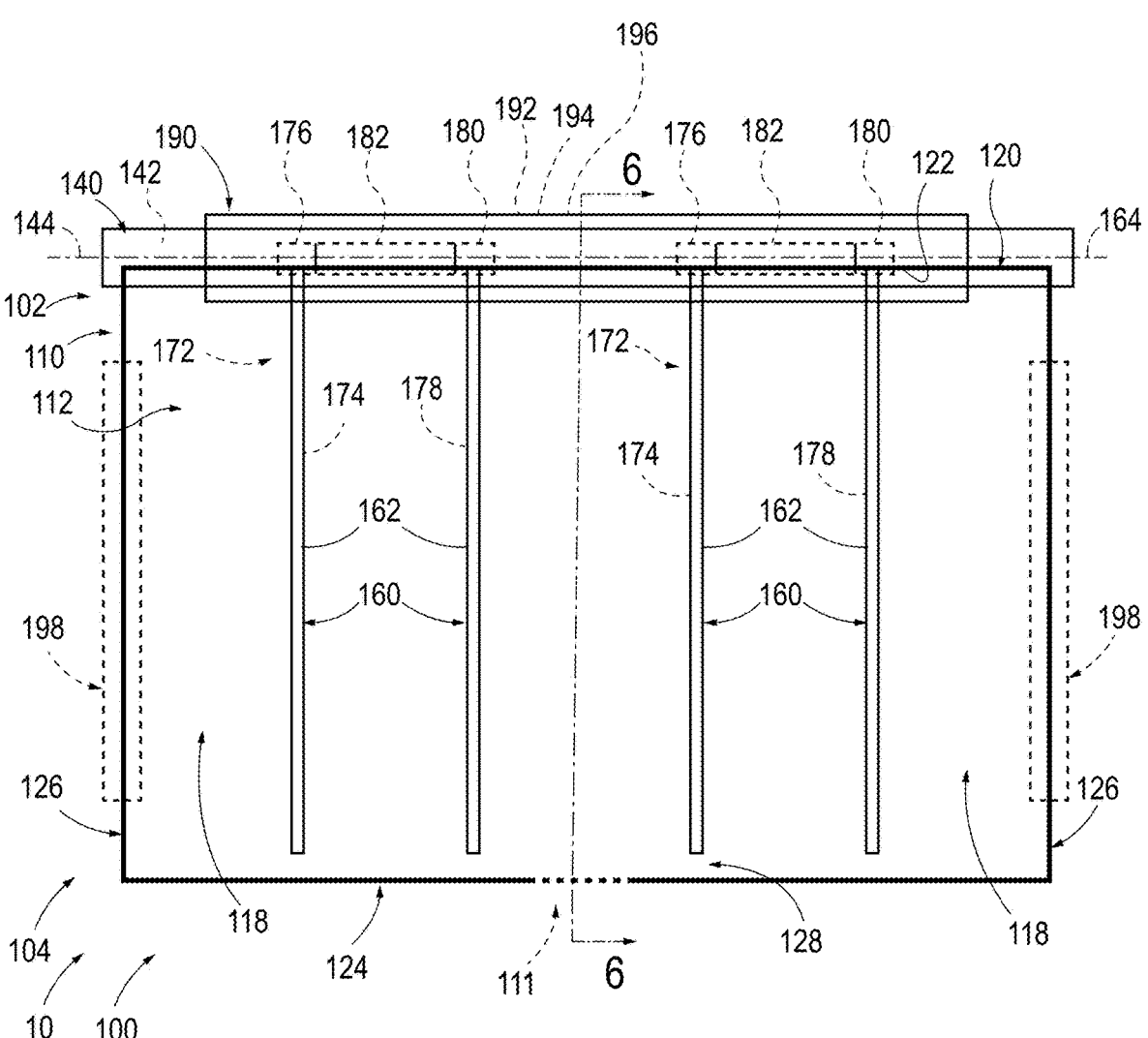
FIG. 5 is a schematic illustration of examples of a tunnel gate that may be utilized in a crab pot, according to the present disclosure.
Figure 6:
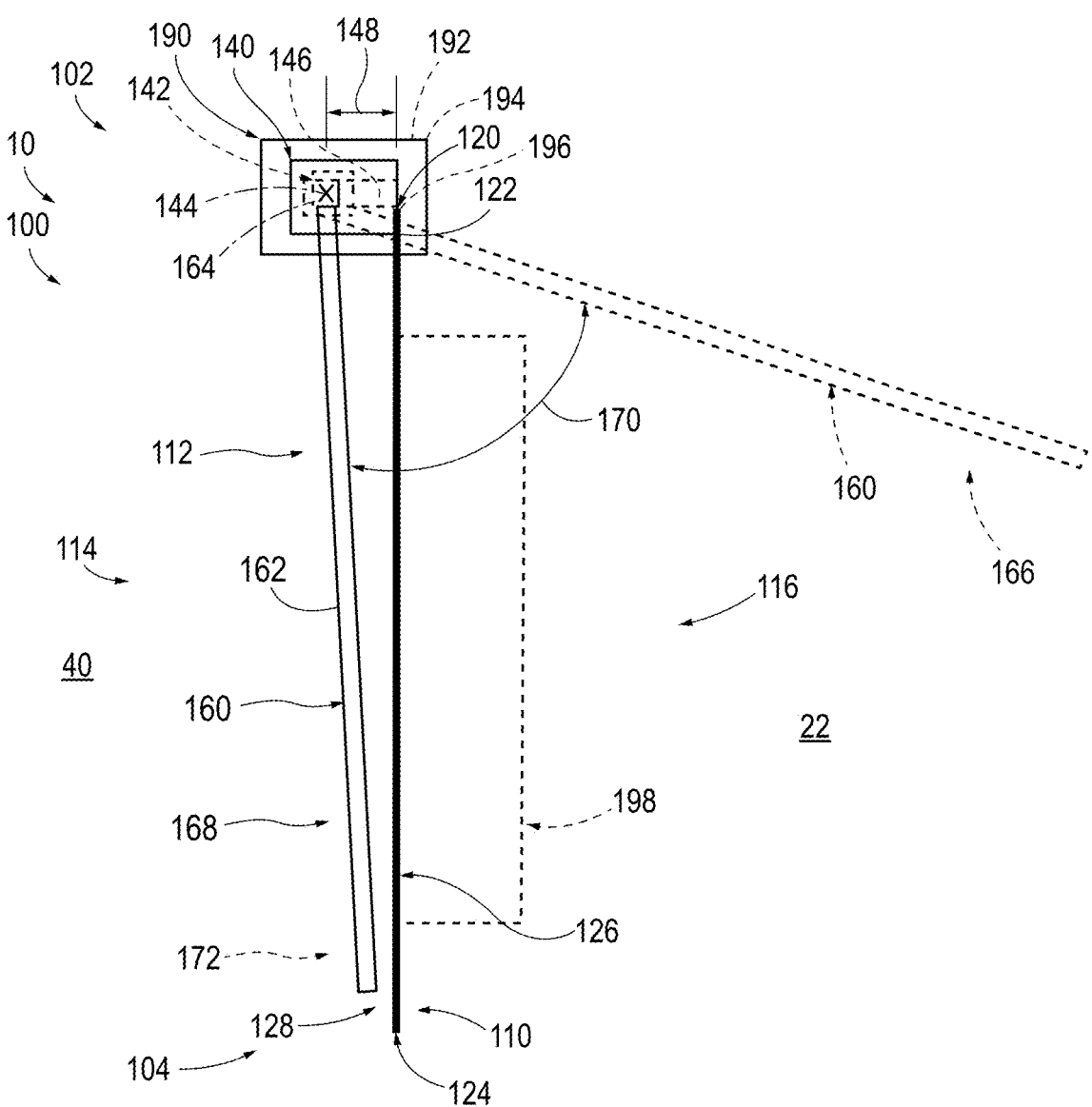
FIG. 6 is a schematic cross-sectional view of the tunnel gate of FIG. 5 taken along line 6-6 of FIG. 5.
Figure 7:
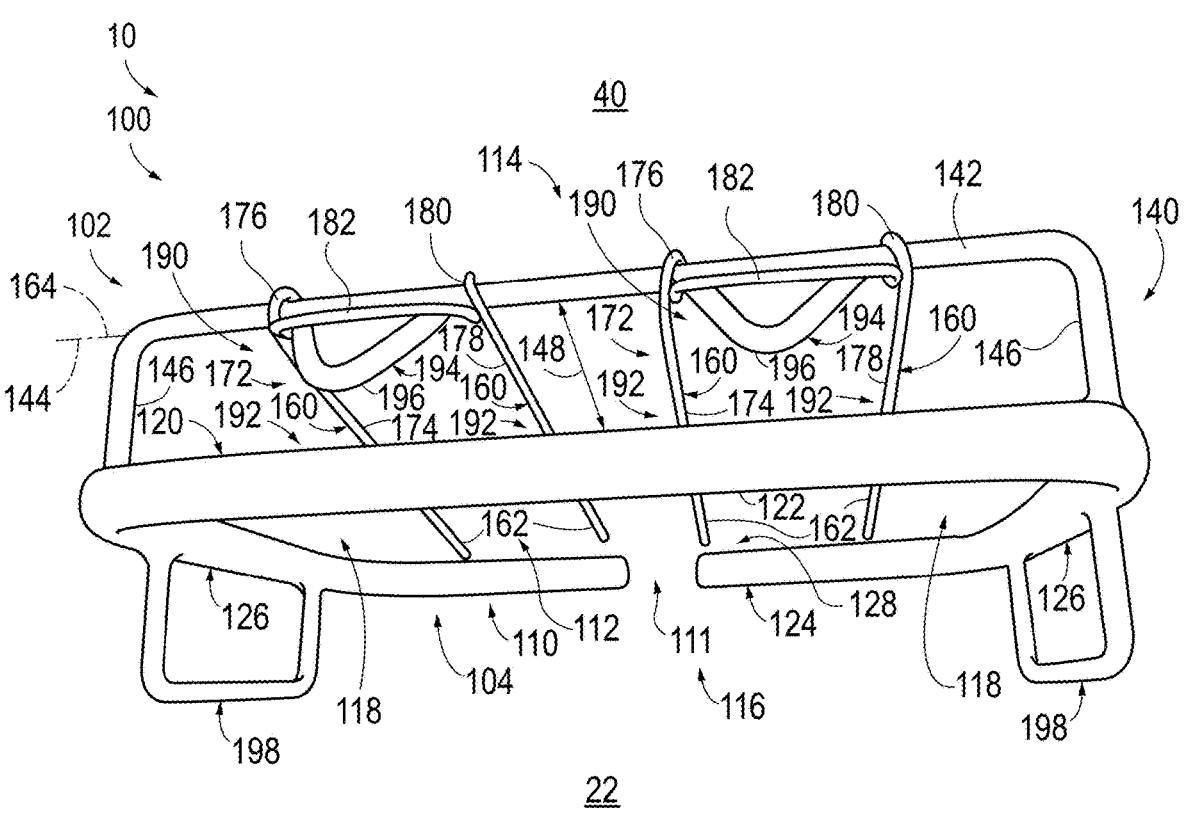
FIG. 7 is a less schematic example of a tunnel gate that may be utilized in a crab pot, according to the present disclosure.

Tunnel gate 100 is positioned at, near, and/or on tunnel exit 44 and may be configured to selective permit and/or restrict movement of crabs through the tunnel exit. As an example, and as discussed in more detail herein, tunnel gate 100 may be configured to selectively permit entry of crabs into crab pot 10 and/or into crab-retaining volume 22 thereof. As another example, and as also discussed in more detail herein, tunnel gate 100 may be configured to selectively restrict, block, and/or stop egress of crabs from crab pot 10 and/or from crab-retaining volume 22 thereof. More specific examples of tunnel gate 100 are illustrated in FIGS. 5-7 and discussed in more detail herein with reference thereto.

Pot frame 20 may include any suitable structure that at least partially bounds crab-retaining volume 22, that supports mesh material 50, to which tunnel gate 100 may be operatively attached, and/or with which tunnel gate 100 may be utilized. In some examples, pot frame 20 includes a lower pot frame region 26, an upper pot frame region 28, and a side pot frame region 30, as illustrated in FIG. 2. In some such examples, side pot frame region 30 may extend between and/or may operatively interconnect lower pot frame region 26 and upper pot frame region 28.

While not required of all examples, crab pot 10 may be cylindrical, at least partially cylindrical, and/or at least substantially cylindrical in shape. In such examples, lower pot frame region 26 may include and/or be a circular, or at least substantially circular, lower pot frame region; and upper pot frame region 28 may include and/or be a circular, or at least substantially circular, upper pot frame region. Also in such examples, side pot frame region 30 may include a plurality of straight, or at least substantially straight, side frame members that extend between the lower pot frame region and the upper pot frame region.

Tunnel region 40 may include any suitable structure that extends between tunnel entrance 42 and tunnel exit 44, that directs crabs toward and/or into tunnel entrance 42, that directs crabs toward and/or through tunnel exit 44, that directs crabs toward and/or through tunnel gate 100, and/or that directs crabs toward and/or into crab-retaining volume 22. In some examples, and as indicated in FIGS. 1-3 at 46, tunnel region 40 may include a tunnel floor 46. In contrast with conventional crab pots, tunnel floor 46 may extend parallel, or at least substantially parallel, to lower pot frame region 26, may be flat, and/or may not be inclined relative to a surface upon which crab pot 10 sits. Stated differently and when the crab pot is positioned within a body of water to catch crabs, the tunnel floor may extend parallel, or at least substantially parallel, to a subsea surface upon which the crab pot rests.

Such a configuration may encourage the crabs to enter crab-retaining volume 22 via tunnel region 40 and/or may increase a catch rate of crab pots 10 when compared to conventional crab pots, in which the crabs may be required to move up the included surface in order to pass through the conventional tunnel region. This shape for tunnel region 40 may be permitted and/or facilitated by an overall construction of tunnel gates 100, according to the present disclosure.

Tunnel gate 100 may be included within crab pot 10 in any suitable manner. As an example, tunnel gate 100 may be operatively attached, or directly attached, to lower pot frame region 26. As another example, lower pot frame region 26 may at least partially define an entry opening 112 of tunnel gate 100 through which crabs may move when entering crab-retaining volume 22. Such a configuration may permit and/or facilitate the flatness of, or lack of incline in, tunnel floor 46 that is discussed herein.

As illustrated in dashed lines in FIG. 2 and in solid lines in FIGS. 3-4, crab pot 10 may include a cull ring 60. Cull ring 60, when present, may be sized to permit small crabs, such as may be smaller than a desired crab size, to exit crab-retaining volume 22. This may include permitting the small crabs to exit the crab-retaining volume without the need for the small crabs to pass from the crab-retaining volume and through tunnel gate 100.

Crab pot 10 and/or components thereof, including pot frame 20, mesh material 50, cull ring 60, and/or tunnel gate 100 may be formed and/or defined by any suitable material and/or materials. Examples of such materials include a corrosion-resistant material, a corrosion-resistant metal, and/or stainless steel. Such a configuration may decrease a potential for degradation of crab pot 10 when utilized in a corrosive environment, such as in salt water.

In some examples, mesh material 50 may include and/or be a fabric mesh material and/or a synthetic mesh material. In some examples, one or more components of crab pot 10, such as pot frame 20, may be covered and/or coated with a resilient material, such as a rubber and/or a rubber foam. Such a configuration may decrease a potential for abrasion of the crab pot and/or may decrease a potential for noise generation when the crab pot rubs against subsea structures.

In some examples, crab pot 10 may be formed and/or defined by a tubular material, by bar stock, and/or by rod stock. As examples, crab pot 10 and/or components thereof may be formed from a metallic tube, a metallic bar, a solid metallic bar, a metallic rod, and/or a solid metallic rod. During operative use of crab pot 10 to catch crabs, such as when crabbing with crab pot 10, the crab pot may be baited and then may be positioned within a subsea environment that includes crabs. Crabs may sense the presence of the bait and may endeavor to enter crab-retaining volume 22. Crab pot 10 may be designed such that the only, or at least the primary, path via which crabs may enter crab-retaining volume 22 is via crawling from tunnel entrance 42, down tunnel 40, to tunnel exit 44. The crabs then may pass through tunnel gate 100 to enter the crab-retaining volume. As discussed in more detail herein, tunnel gate 100 may be configure to permit crabs to enter the crab-retaining volume but to resist egress of crabs from the crab-retaining volume.

Field tests performed with crab pots 10 that include tunnel gates 100, according to the present disclosure, indicate that crab pots 10 are significantly more effective at catching crabs when compared to conventional crab pots. In one test, both conventional crab pots and crab pots 10 according to the present disclosure were fished in the same area and at the same time. Crab pots 10 exhibited a threefold increase in the number of crabs retained therein when compared to conventional crab pots. It is postulated that this increase may be caused by a variety of aspects of crab pots 10 that represent improvements over conventional crab pots. As an example, and as discussed, the flatness of tunnel floor 46 may make it easier for crabs to pass through tunnel 40 and/or may decrease a potential for crabs to turn around after entering the tunnel. As another example, and as illustrated in FIGS. 3-7, crabs may see an open space 128 at the bottom of entry opening 112. The presence of this open space may encourage crabs to pass through tunnel gate 100.

FIGS. 5-7 illustrate examples of tunnel gates 100, according to the present disclosure. In particular, FIG. 5 is a schematic illustration of examples of a tunnel gate 100 that may be utilized in crab pots 10, and FIG. 6 is a schematic cross-sectional view of the tunnel gate of FIG. 5 taken along line 6-6 of FIG. 5. FIG. 7 is a less schematic example of tunnel gate 100.

As collectively illustrated by FIGS. 5-7, tunnel gates 100 include a gate frame 110, a trigger mount 140, a plurality of trigger bars 160, and a trigger stop 190. Gate frame 110 defines an entry opening 112 that may be shaped and/or sized to permit crabs to pass therethrough, such as to enter crab pot 10 and/or the crab-retaining volume thereof. Trigger mount 140 is positioned within an upper gate region 102 of tunnel gate 100. Trigger bars 160 are pivotally attached to trigger mount 140 and extend toward a lower gate region 104 of the tunnel gate. Trigger bars 160 are configured to rotate, relative to gate frame 110, about a rotation axis 164 that may extend parallel, or at least substantially parallel, to entry opening 112 and/or to a plane that is defined by and/or within the entry opening. Trigger stop 190 is positioned within, or entirely within, upper gate region 102 and is configured to restrict rotation of trigger bars 160 about rotation axis 164. This may include restricting the rotation of the trigger bars between, to between, or only to between, an open orientation 166, as illustrated in dashed lines in FIG. 6, and a closed orientation 168, as illustrated in solid lines in FIG. 6.

When crab pots 10 that include tunnel gate 100 are utilized to catch crabs, gravity initially may cause trigger bars 160 to be in closed orientation 168. Crabs may crawl into tunnel 40 and may approach tunnel gate 100 from an exterior side 114, as illustrated in FIGS. 6-7. The crabs then may encounter trigger bars 160. However, as illustrated, trigger bars 160 may be configured to rotate and/or pivot to open orientation 166 when contacted by crabs, thereby permitting the crabs to pass to an interior side 116 of the tunnel gate and/or to enter crab-retaining volume 22, as also illustrated in FIGS. 6-7. After the crabs enter the crab-retaining volume, trigger bars 160 may fall back to closed orientation 168 under the influence of gravity. Because trigger stop 190 restricts rotation of trigger bars 160 about rotation axis 164 to between open orientation 166 and closed orientation 168 of FIG. 6, the trigger bars retain the crabs within the crab pot and/or restrict egress of the crabs from the crab pot.

Gate frame 110 may include any suitable structure that may be adapted, configured, designed, and/or constructed to define entry opening 112 and/or that is shaped and/or sized to permit crabs to pass therethrough to enter the crab pot. In some examples, entry opening 112 may include and/or be a rectangular, or at least partially rectangular, entry opening. In some examples, entry opening 112 may be rectangular with rounded corners.

Gate frame 110 may extend around at least a threshold fraction of a perimeter of entry opening 112. Examines of the threshold fraction include 75%, 80%, 85%, 90%, 95%, 99%, or 100%. In some examples, and as discussed, the pot frame of crab pot 10 may define a fraction, or a remainder, of the perimeter of the entry opening. As an example, the pot frame may extend within a gap 111 in gate frame 110, as illustrated in FIGS. 5 and 7. Such a configuration may permit the tunnel floor of the tunnel region to be flat, or at least substantially flat, as discussed in more detail herein.

Tunnel gate 100 may be more durable when compared to conventional tunnel gates of conventional crab pots. As an example, one or more materials that define one or more components of tunnel gate 100 may be thicker and/or stronger when compared to conventional tunnel gates. In a specific example, a transverse cross-section of gate frame 110 may have a diameter, or an effective diameter, of at least 8 millimeters (mm), at least 9 mm, at least 10 mm, at least 11 mm, at least 12 mm, at least 13 mm, at least 14 mm, at most 20 mm, at most 18 mm, at most 16 mm, at most 14 mm, and/or at most 12 mm. In a more specific example, the diameter of the transverse cross-section of the gate frame may be equal, or at least substantially equal, to 12.7 mm, or 0.5 inches.

Entry opening 112 may have any suitable dimensions. As an example, an entry opening width of the entry opening may be at least 150 mm, at least 160 mm, at least 170 mm, at least 180 mm, at least 190 mm, at least 200 mm, at least 210 mm, at least 220 mm, at most 250 mm, at most 240 mm, at most 230 mm, at most 220 mm, at most 210 mm, at most 200 mm, and/or at most 190 mm. As another example, an entry opening height of the entry opening may be at least 100 mm, at least 110 mm, at least 120 mm, at least 130 mm, at least 140 mm, at least 150 mm, at least 160 mm, at most 200 mm, at most 190 mm, at most 180 mm, at most 170 mm, at most 160 mm, at most 150 mm, and/or at most 140 mm.

In some examples, gate frame 110 may include an upper frame region 120, a lower frame region 124, and a pair of opposed-side frame regions 126. Side frame regions 126 may extend between, and operatively interconnect, upper frame region 120 and lower frame region 124. Stated differently, entry opening 112 may be defined between upper frame region 120 and lower frame region 124 and/or between the pair of opposed-side frame regions 126. In some examples, gate frame 110 may include and/or be a unitary gate frame that may be defined by a single length of gate frame material, such as may be bent and/or deformed to define the various structures of gate frame 110.

Trigger mount 140 may include any suitable structure that may be positioned within upper gate region 102 and/or to which trigger bars 160 may be pivotally attached. In some examples, trigger mount 140 may be positioned on exterior side 114 of entry opening 112.

As an example, trigger mount 140 may include an elongate trigger mount bar 142, which may define an elongate trigger mount bar axis 144. In such a configuration, rotation axis 164 may be parallel to, at least substantially parallel to, and/or coextensive with elongate trigger mount bar axis 144. Elongate trigger mount bar 142 may extend parallel, or at least substantially parallel, to upper frame region 120 of gate frame 110 and/or to entry opening 112.

In some such examples, trigger mount 140 also may include a pair of opposed trigger mount projections 146, as illustrated in FIGS. 6-7. The pair of opposed trigger mount projections may extend from elongate trigger mount bar axis 144, may extend to upper gate region 102 and/or to upper frame region 120, and/or may be welded to upper gate region 102 and/or to upper frame region 120. The pair of opposed trigger mount projections 146 may extend perpendicular, or at least substantially perpendicular, to elongate trigger mount bar axis 144 and/or to entry opening 112. In some such examples, trigger mount 140 may include and/or be a unitary trigger mount 140, such as may be defined by a single length of trigger mount material that may define elongate trigger mount bar 142 and the pair of opposed trigger mount projections 146.

In some examples, elongate trigger mount bar 142 may be spaced-apart from upper gate region 102 and/or from upper frame region 120, such as by a threshold spacing distance 148, as illustrated in FIGS. 6-7. Examples of the threshold spacing distance include distances of at least 10 mm, at least 15 mm, at least 20 mm, at least 25 mm, at least 30 mm, at least 35 mm, at most 50 mm, at most 45 mm, at most 40 mm, at most 35 mm, at most 30 mm, and/or at most 25 mm.

Trigger bars 160 may include any suitable structure that may be pivotally attached to trigger mount 140, that may extend toward lower gate region 104, and/or that may be configured to rotate relative to gate frame 110 about rotation axis 164. In some examples, trigger bars 160 may include an attached pair 172 of trigger bars 160. Attached pair 172 may be configured together to rotate about rotation axis 164. As an example, attached pair 172 may be defined by a single length of trigger bar material.

In a specific example, the single length of trigger bar material may define a first linear, or at least substantially linear, trigger bar region 174, a first trigger bar attachment region 176, a second linear, or at least substantially linear, trigger bar region 178, a second trigger bar attachment region 180, and a trigger bar joining region 182, as perhaps best illustrated in FIGS. 5 and 7. First trigger bar attachment region 176 and second trigger bar attachment region 180 each may extend around, may extend entirely around, and/or may encircle a corresponding region of trigger mount 140 and/or elongate trigger mount bar 142 thereof, such as to permit and/or facilitate rotation of attached pair 172 about rotation axis 164. Trigger bar joining region 182 may extend between first trigger bar attachment region 176 and second trigger bar attachment region 180.

Trigger bars 160 and/or the single length of trigger bar material may have and/or define any suitable dimensions and/or shape. As an example, a transverse cross-section of the trigger bar and/or of the single length of trigger bar material may have a diameter, or an effective diameter, of at least 1.5 mm, at least 1.6 mm, at least 1.7 mm, at least 1.8 mm, at least 1.9 mm, at least 2 mm, at least 2.1 mm, at least 2.2 mm, at least 2.3 mm, at most 3 mm, at most 2.9 mm, at most 2.8 mm, at most 2.7 mm, at most 2.6 mm, at most 2.5 mm, at most 2.4 mm, at most 2.3 mm, and/or at most 2.2 mm. In a specific example, the diameter may be equal, or at least substantially equal, to 2.3 mm.

When in closed orientation 168, and as illustrated, trigger bars 160 may be spaced-apart from, or may not touch, lower frame region 124 of gate frame 110. Stated differently, open space 128 may extend between trigger bars 160 and lower frame region 124. Such a configuration may encourage crabs to pass through tunnel gate 100, as discussed in more detail herein. Also when in closed orientation 168, and as illustrated, trigger bars 160 may extend toward entry opening 112, at least partially into entry opening 112, and/or toward lower frame region 124. Such a configuration also may encourage crabs to pass through the tunnel gate.

When in open orientation 166, and as illustrate in FIG. 6, trigger bars 160 may extend through, or at least partially through, entry opening 112 and/or toward upper frame region 120 of gate frame 110. Additionally or alternatively, and as discussed in more detail herein, trigger bars 160 may contact upper frame region 120, such as a lower surface 122 thereof. Stated differently, upper frame region 120 may at least partially define trigger stop 190, which may be define open orientation 166 and/or a maximum extent to which trigger bars 160 may open.

Trigger bars 160 may define or may be configured to rotate about rotation axis 164 through a trigger bar angular range-of-motion 170, as illustrated in FIG. 6. Examples of the trigger bar angular range-of-motion include angular ranges of at least 45 degrees (°), at least 50°, at least 55°, at least 60°, at least 65°, at least 70°, at least 75°, at least 80°, at most 110°, at most 105°, at most 100°, at most 95°, at most 90°, at most 85°, and/or at most 80°.

Trigger stop 190 may include any suitable structure that may be positioned within upper gate region 102 of tunnel gate 100 and/or that may be configured to restrict rotation of trigger bars 160 about rotation axis 164 between open orientation 166 and closed orientation 168. As an example, trigger stop 190 may include an open orientation trigger stop 192, which may be configured to define open orientation 166, and/or a closed orientation trigger stop 194, which may be configured to define closed orientation 168. In some examples, open orientation trigger stop 192 may be spaced-apart, separate, and/or distinct from closed orientation trigger stop 194.

As an example, open orientation trigger stop 192 may be defined by lower surface 122 of upper frame region 120. In such a configuration, open orientation trigger stop 192 may be configured to contact trigger bars 160, or a corresponding linear trigger bar region 162 of each trigger bar 160, to define open orientation 166.

As another example, closed orientation trigger stop 194 may be defined by a trigger stop protrusion 196, which may extend from trigger mount 140. In such a configuration, closed orientation trigger stop 194 may be configured to contact trigger bars 160, to contact linear trigger bar region 162, and/or to contact a corresponding trigger bar joining region 182 of each attached pair 172 of trigger bars 160, to define closed orientation 168.

As illustrated in dashed lines in FIGS. 5-6 and in solid lines in FIG. 7, tunnel gates 100 may include a pair of opposed-side restricting-projections 198, which also may be referred to herein as projections 198. Projections 198 may be configured to restrict access of crabs to a region 118 of entry opening 112 that extends between side regions 126 of gate frame 110 and adjacent trigger bars 160. Projections 198 may be positioned on and/or may extend from interior side 116 of tunnel gate 100. Additionally or alternatively, projections 198 may extend from gate frame 110 and away from entry opening 112. Such a configuration may decrease a potential for crabs, which already are within crab-retaining volume 22 of crab pot 10, to defeat tunnel gate 100 and/or to egress from the crab pot via the tunnel gate.

Figure 8:
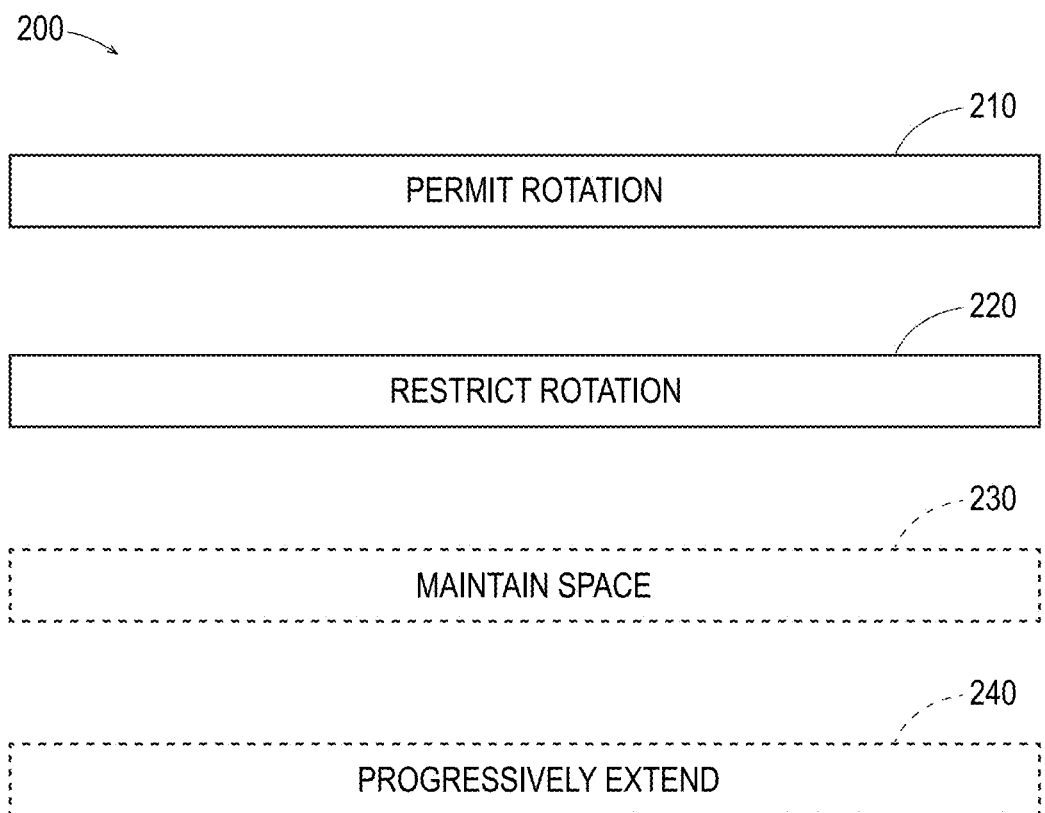
FIG. 8 is a flowchart depicting examples of methods of utilizing a tunnel gate of a crab pot, according to the present disclosure.

FIG. 8 is a flowchart depicting examples of methods 200 of utilizing a tunnel gate of a crab pot, according to the present disclosure. The tunnel gate includes a gate frame that defines an entry opening and a trigger mount positioned within an upper gate region of the tunnel gate. The tunnel gate also includes a plurality of trigger bars pivotally attached to the trigger mount and extending toward a lower gate region of the tunnel gate. Examples of the tunnel gate are disclosed herein with reference to tunnel gate 100. Examples of the crab pot are disclosed herein with reference to crab pot 10.

Methods 200 include permitting rotation at 210 and restricting rotation at 220. Methods 200 also may include maintaining space at 230 and/or progressively extending at 240.

Permitting rotation at 210 may include permitting rotation of the plurality of trigger bars relative to the gate frame. This may include permitting the rotation about a rotation axis. The rotation axis may extend parallel, or at least substantially parallel, to the entry opening.

Restricting rotation at 220 may include restricting rotation of the plurality of trigger bars utilizing a trigger stop of the tunnel gate. The trigger stop may be positioned, or entirely positioned, within the upper gate region. The restricting at 220 may include restricting the rotation between an open orientation and a closed orientation. The open orientation may permit entry of crabs into the crab pot via the entry opening, and the closed orientation may restrict egress of crabs from the crab pot via the entry opening.

The restricting at 220 may be performed in any suitable manner. As an example, the restricting at 220 may include contacting the plurality of trigger bars with, or to, an open orientation trigger stop when the plurality of trigger bars is in the open orientation and/or to define, or specify, the open orientation. In some examples, the open orientation trigger stop may include, or be, the upper frame region and/or a lower surface of the upper frame region.

As another example, the restricting at 220 may include contacting the plurality of trigger bars with, or to, a closed orientation trigger stop when the plurality of trigger bars is in the closed orientation and/or to define, or specify, the closed orientation. In some examples, the closed orientation trigger stop may include, or be, a trigger strop protrusion that extends from the trigger mount. In some examples, the closed orientation trigger stop may be distinct, separate, and/or spaced-apart from the open orientation trigger stop.

Maintaining space at 230 may include maintaining any suitable space within the tunnel gate, such as to encourage crabs to enter the crab pot via the tunnel gate and/or to restrict egress of crabs from the crab pot via the tunnel gate. As examples, the maintaining at 230 may include maintaining an open space between the plurality of trigger bars and the lower gate region and/or maintaining a spaced-apart relationship between the plurality of trigger bars and the lower gate region. This may include maintaining the open space and/or the spaced-apart relationship throughout an entirety of a trigger bar angular range-of-motion that is defined between the open orientation and the closed orientation. As another example, the maintaining at 230 may include maintaining a spaced-apart relationship among the plurality of trigger bars. This may include maintaining the spaced-apart relationship at least partially utilizing the closed orientation trigger stop.

Progressively extending at 240 may include progressively extending the plurality of trigger bars through the entry opening as the plurality of trigger bars transitions from the closed orientation to the open orientation. As an example, and when the plurality of trigger bars is in the closed orientation, the plurality of trigger bars, or an entirety of the plurality of trigger bars, may be external the entry opening and/or may not pass through a plane that extends across the entry opening. As another example, and as the plurality of trigger bars is transitioned from the closed orientation to the open orientation, the progressively extending at 240 may include progressively extending more, or a greater fraction of a length of, the plurality of trigger bars through the entry opening and/or onto a crab-retaining volume side of the entry opening.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram of FIG. 8, including with two or more of the blocks, or steps, occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/ or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of tunnel gates, crab pots, and methods according to the present disclosure, are presented in the following enumerated paragraphs. It is within the scope of the present disclosure that an individual step of a method recited herein, including in the following enumerated paragraphs, may additionally or alternatively be referred to as a "step for" performing the recited action.

A1. A tunnel gate for a crab pot, the tunnel gate comprising:

a gate frame that defines an entry opening that is sized to permit crabs to pass therethrough and enter the crab pot;

a trigger mount positioned within an upper gate region of the tunnel gate;

a plurality of trigger bars pivotally attached to the trigger mount and extending toward a lower gate region of the tunnel gate, wherein the plurality of trigger bars is configured to rotate, relative to the gate frame, about a rotation axis that extends parallel, or at least substantially parallel, to the entry opening; and a trigger stop positioned, or entirely positioned, within the upper gate region, wherein the trigger stop is configured to restrict rotation of the plurality of trigger bars about the rotation axis between, or only between, an open orientation, which permits entry of the crabs into the crab pot via the entry opening, and a closed orientation, which restricts egress of the crabs from the crab pot via the entry opening.

A2. The tunnel gate of paragraph A1, wherein the entry opening is a rectangular, or at least partially rectangular, entry opening.

A3. The tunnel gate of any of paragraphs A1-A2, wherein the entry opening is rectangular with rounded corners.

A4. The tunnel gate of any of paragraphs A1-A3, wherein the gate frame extends around at least a threshold fraction of a perimeter of the entry opening, optionally wherein the threshold fraction is 75%, 80%, 85%, 90%, 95%, 99%, or 100%.

A5. The tunnel gate of any of paragraphs A1-A4, wherein a transverse cross-section of the gate frame has a diameter, or an effective diameter, of at least one of:

(i) at least 8 millimeters (mm), at least 9 mm, at least 10 mm, at least 11 mm, at least 12 mm, at least 13 mm, or at least 14 mm;

(ii) at most 20 mm, at most 18 mm, at most 16 mm, at most 14 mm, or at most 12 mm; and (iii) equal, or at least substantially equal, to 12.7 mm.

A6. The tunnel gate of any of paragraphs A1-A5, wherein an entry opening width of the entry opening is at least one of:

(i) at least 150 mm, at least 160 mm, at least 170 mm, at least 180 mm, at least 190 mm, at least 200 mm, at least 210 mm, or at least 220 mm; and (ii) at most 250 mm, at most 240 mm, at most 230 mm, at most 220 mm, at most 210 mm, at most 200 mm, or at most 190 mm.

A7. The tunnel gate of any of paragraphs A1-A6, wherein an entry opening height of the entry opening is at least one of:

(i) at least 100 mm, at least 110 mm, at least 120 mm, at least 130 mm, at least 140 mm, at least 150 mm, or at least 160 mm; and (ii) at most 200 mm, at most 190 mm, at most 180 mm, at most 170 mm, at most 160 mm, at most 150 mm, or at most 140 mm.

A8. The tunnel gate of any of paragraphs A1-A7, wherein the gate frame includes an upper frame region, a lower frame region, and a pair of opposed-side frame regions that extend between and operatively interconnect the upper frame region and the lower frame region.

A9. The tunnel gate of paragraph A8, wherein the entry opening is defined at least one of:

(i) between the upper frame region and the lower frame region; and (ii) between the pair of opposed-side frame regions.

A10. The tunnel gate of any of paragraphs A1-A9, wherein the gate frame is a unitary gate frame that is defined by a single length of gate frame material.

A11. The tunnel gate of any of paragraphs A1-A10, wherein the trigger mount includes an elongate trigger mount bar that defines an elongate trigger mount bar axis, and further wherein the rotation axis is parallel, or at least substantially parallel, to the elongate trigger mount bar axis.

A12. The tunnel gate of paragraph A11, wherein the elongate trigger mount bar axis extends parallel, or at least substantially parallel, to an/the upper frame region of the gate frame.

A13. The tunnel gate of any of paragraphs A11-A12, wherein the trigger mount further includes a pair of opposed trigger mount projections that extend from the elongate trigger mount bar to an/the upper gate region of the gate frame.

A14. The tunnel gate of paragraph A13, wherein the trigger mount is a unitary trigger mount that is defined by a single length of trigger mount material that defines the elongate trigger mount bar and the pair of opposed trigger mount projections.

A15. The tunnel gate of any of paragraphs A13-A14, wherein the pair of opposed trigger mount projections is operatively attached, or welded, to the upper gate region.

A16. The tunnel gate of any of paragraphs A13-A15, wherein the pair of opposed trigger mount projections extends perpendicular, or at least substantially perpendicular, to the elongate trigger mount bar axis.

A17. The tunnel gate of any of paragraphs A13-A16, wherein the pair of opposed trigger mount projections extends perpendicular, or at least substantially perpendicular, to the entry opening.

A18. The tunnel gate of any of paragraphs A11-A17, wherein the elongate trigger mount bar is spaced-apart from an/the upper frame region of the gate frame, optionally by a threshold spacing distance of at least one of:

(i) at least 10 mm, at least 15 mm, at least 20 mm, at least 25 mm, at least 30 mm, or at least 35 mm; and (ii) at most 50 mm, at most 45 mm, at most 40 mm, at most 35 mm, at most 30 mm, or at most 25 mm.

A19. The tunnel gate of any of paragraphs A1-A18, wherein the trigger mount is positioned on an exterior side of the entry opening.

A20. The tunnel gate of any of paragraphs A1-A19, wherein the plurality of trigger bars includes an attached pair of trigger bars.

A21. The tunnel gate of paragraph A20, wherein both trigger bars in the attached pair of trigger bars are configured together to rotate about the rotation axis.

A22. The tunnel gate of any of paragraphs A20-A21, wherein the attached pair of trigger bars is defined by a single length of trigger bar material.

A23. The tunnel gate of paragraph A22, wherein the single length of trigger bar material defines:

(i) a first linear, or at least substantially linear, trigger bar region;

(ii) a first trigger bar attachment region that extends around, or entirely around, a corresponding region of the trigger mount;

(iii) a second linear, or at least substantially linear, trigger bar region;

(iv) a second trigger bar attachment region that extends around, or entirely around, a second corresponding region of the trigger mount; and (v) a trigger bar joining region that extends between the first trigger bar attachment region and the second trigger bar attachment region.

A24. The tunnel gate of any of paragraphs A22-A23, wherein a transverse cross-section of the single length of trigger bar material has a diameter, or an effective diameter, of at least one of:

(i) at least 1.5 mm, at least 1.6 mm, at least 1.7 mm, at least 1.8 mm, at least 1.9 mm, at least 2 mm, at least 2.1 mm, at least 2.2 mm, or at least 2.3 mm;

(ii) at most 3 mm, at most 2.9 mm, at most 2.8 mm, at most 2.7 mm, at most 2.6 mm, at most 2.5 mm, at most 2.4 mm, at most 2.3 mm, or at most 2.2 mm; and (iii) equal, or at least substantially equal, to 2.3 mm.

A25. The tunnel gate of any of paragraphs A1-A24, wherein, when in the closed orientation, the plurality of trigger bars is spaced-apart from a/the lower frame region of the gate frame.

A26. The tunnel gate of any of paragraphs A1-A25, wherein, when in the closed orientation, the plurality of trigger bars extends from the trigger mount and at least one of:

(i) toward the entry opening;

(ii) at least partially into the entry opening; and (iii) toward a/the lower frame region of the gate frame.

A27. The tunnel gate of any of paragraphs A1-A26, wherein, when in the open orientation, the plurality of trigger bars extends from the trigger mount and at least one of:

(i) partially through the entry opening; and (ii) toward an/the upper frame region of the gate frame.

A28. The tunnel gate of any of paragraphs A1-A27, wherein the plurality of trigger bars defines a trigger bar angular range-of-motion between the open orientation and the closed orientation, optionally wherein the trigger bar angular range-of-motion is at least one of:

(i) at least 45 degrees (°), at least 50°, at least 55°, at least 60°, at least 65°, at least 70°, at least 75°, or at least 80°; and (ii) at most 110°, at most 105°, at most 100°, at most 95°, at most 90°, at most 85°, or at most 80°.

A29. The tunnel gate of any of paragraphs A1-A28, wherein the trigger stop includes an open orientation trigger stop, which is configured to define the open orientation of the plurality of trigger bars, and a closed orientation trigger stop, which is configured to define the closed orientation of the plurality of trigger bars.

A30. The tunnel gate of paragraph A29, wherein the open orientation trigger stop is spaced-apart from the closed orientation trigger stop.

A31. The tunnel gate of any of paragraphs A29-A30, wherein the open orientation trigger stop is defined by a lower surface of an/the upper frame region of the gate frame, optionally wherein the open orientation trigger stop is configured to at least one of:

(i) contact the plurality of trigger bars to define the open orientation; and (ii) contact a corresponding linear trigger bar region of each trigger bar of the plurality of trigger bars to define the open orientation.

A32. The tunnel gate of any of paragraphs A29-A31, wherein the closed orientation trigger stop is defined by a trigger stop protrusion that extends from the trigger mount.

A33. The tunnel gate of any of paragraphs A29-A32, wherein the closed orientation trigger stop is configured to at least one of:

(i) contact the plurality of trigger bars to define the closed orientation;

(ii) contact a/the corresponding linear trigger bar region of each trigger bar of the plurality of trigger bars to define the closed orientation; and (iii) contact a/the trigger bar joining region of an/the attached pair of trigger bars to define the closed orientation.

A34. The tunnel gate of any of paragraphs A1-A33, wherein the tunnel gate further includes a pair of opposed-side access-restricting projections that restricts access of the crabs to a region of the entry opening that extends between a/the pair of opposed-side frame regions of the gate frame and adjacent trigger bars of the plurality of trigger bars.

A35. The tunnel gate of paragraph A34, wherein the pair of opposed-side access-restricting projections at least one of:
    (i) is positioned on an interior side of the entry opening; and
    (ii) extends from the gate frame and away from the entry opening.

B1. A crab pot, comprising:
    a pot frame that at least partially bounds a crab-retaining volume;
    a tunnel region that extends from a tunnel entrance, which is proximate an external periphery of the pot frame, to a tunnel exit, which opens into the crab-retaining volume;
    the tunnel gate of any of paragraphs A1-A35 positioned at the tunnel exit; and
    a mesh material operatively attached to the pot frame such that the mesh material at least partially bounds the crab-retaining volume.

B2. The crab pot of paragraph B1, wherein the pot frame includes:
    (i) a lower pot frame region, optionally wherein the lower pot frame region is a circular, or at least substantially circular, lower pot frame region;
    (ii) an upper pot frame region, optionally wherein the upper pot frame region is a circular, or at least substantially circular, upper pot frame region; and
    (iii) a side pot frame region that operatively interconnects the lower pot frame region and the upper pot frame region, optionally wherein the side pot frame region includes a plurality of linear, or at least substantially linear, side frame members.

B3. The crab pot of any of paragraphs B1-B2, wherein the crab pot further includes a cull ring sized to permit small crabs to exit the crab-retaining volume.

B4. The crab pot of any of paragraphs B1-B3, wherein the tunnel region includes a tunnel floor.

B5. The crab pot of paragraph B4, wherein the tunnel floor extends parallel, or at least substantially parallel, to a/the lower pot frame region of the pot frame.

B6. The crab pot of any of paragraphs B4-B5, wherein, when the crab pot is positioned within a body of water to catch crabs, the tunnel floor extends parallel, or at least substantially parallel, to a subsea surface upon which the crab pot rests.

B7. The crab pot of any of paragraphs B1-B6, wherein the tunnel gate is operatively attached, or directly attached, to a/the lower pot frame region of the pot frame.

B8. The crab pot of any of paragraphs B1-B7, wherein the entry opening is at least partially defined by a/the lower pot frame region of the pot frame.

C1. A method of operating a tunnel gate of a crab pot, wherein the tunnel gate includes a gate frame that define an entry opening, a trigger mount positioned within an upper gate region of the tunnel gate, and a plurality of trigger bars pivotally attached to the trigger mount and extending toward a lower gate region of the tunnel gate, the method comprising:
    permitting rotation of the plurality of trigger bars relative to the gate frame and about a rotation axis that extends parallel, or at least substantially parallel, to the entry opening; and
    restricting rotation of the plurality of trigger bars, utilizing a trigger stop of the tunnel gate that is positioned, or entirely positioned, within the upper gate region, between an open orientation, which permits entry of the crabs into the crab pot via the entry opening, and a closed orientation, which restricts egress of the crabs from the crab pot via the entry opening.

C2. The method of paragraph C1, wherein the method further includes at least one of:
    (i) maintaining an open space between the plurality of trigger bars and the lower gate region throughout an entirety of a trigger bar angular range-of-motion, defined between the open orientation and the closed orientation; and
    (ii) maintaining a spaced-apart relationship between the plurality of trigger bars and the lower gate region throughout the entirety of the trigger bar angular range-of-motion.

C3. The method of any of paragraphs C1-C2, wherein the restricting rotation includes contacting the plurality of trigger bars with an open orientation trigger stop when the plurality of trigger bars is in the open orientation, optionally wherein the open orientation trigger stop includes at least one of the upper frame region and a lower surface of the upper frame region.

C4. The method of any of paragraphs C1-C3, wherein the restricting rotation includes contacting the plurality of trigger bars with a closed orientation trigger stop when the plurality of trigger bars is in the closed orientation, optionally wherein the closed orientation trigger stop includes a trigger stop protrusion that projects from the trigger mount.

C5. The method of paragraph C4, wherein the method further includes maintaining a spaced-apart relationship among the plurality of trigger bars at least partially utilizing the closed orientation trigger stop.

C6. The method of any of paragraphs C1-C5, wherein the method further includes progressively extending the plurality of trigger bars through the entry opening, as the plurality of trigger bars transitions from the closed orientation to the open orientation.

C7. The method of any of paragraphs C1-C6, wherein the tunnel gate includes any suitable structure, function, and/or feature of any of the tunnel gates of any of paragraphs A1-A35.

C8. The method of any of paragraphs C1-C7, wherein the crab pot includes any suitable structure, function, and/or feature of any of the crab pots of any of paragraphs B1-B8.

INDUSTRIAL APPLICABILITY

The tunnel gates, the crab pots, and the methods disclosed herein are applicable to the crab pot manufacturing and crabbing industries.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A tunnel gate for a crab pot, the tunnel gate comprising:
a gate frame that defines an entry opening that is sized to permit crabs to pass therethrough and enter the crab pot;
a trigger mount positioned within an upper gate region of the tunnel gate, the trigger mount is spaced from and on an exterior side of the entry opening and is configured such that, when crabs approach the tunnel gate from the exterior side of the entry opening, the plurality of trigger bars permits the crabs to enter and be trapped within an interior of the crab pot;
a plurality of trigger bars pivotally attached to the trigger mount and extending toward a lower gate region of the tunnel gate, wherein the plurality of trigger bars is configured individually to rotate, relative to the gate frame, about a rotation axis that extends at least substantially parallel to the entry opening; and
a trigger stop assembly positioned within the upper gate region, wherein the trigger stop assembly is configured to restrict rotation of the plurality of trigger bars about the rotation axis between an open orientation, which permits entry of the crabs into the crab pot via the entry opening, and a closed orientation, which restricts egress of the crabs from the crab pot via the entry opening; and
wherein, when in the closed orientation, the plurality of trigger bars is spaced-apart from a lower frame region of the gate frame.

2. The tunnel gate of claim 1, wherein the trigger mount includes an elongate trigger mount bar that defines an elongate trigger mount bar axis, and further wherein the rotation axis is at least substantially parallel to the elongate trigger mount bar axis.

3. The tunnel gate of claim 2, wherein the trigger mount further includes a pair of opposed trigger mount projections that extend from the elongate trigger mount bar and rigidly attach the elongate trigger mount bar to an upper frame region of the gate frame.

4. The tunnel gate of claim 1, wherein the plurality of trigger bars includes an attached pair of trigger bars, wherein both trigger bars in the attached pair of trigger bars are configured together to rotate about the rotation axis.

5. The tunnel gate of claim 4, wherein the attached pair of trigger bars is defined by a single length of trigger bar material.

6. The tunnel gate of claim 5, wherein the single length of trigger bar material defines:
(i) a first at least substantially linear trigger bar region;
(ii) a first trigger bar attachment region that extends around a corresponding region of the trigger mount;
(iii) a second at least substantially linear trigger bar region;
(iv) a second trigger bar attachment region that extends around a second corresponding region of the trigger mount; and (v) a trigger bar joining region that extends between the first trigger bar attachment region and the second trigger bar attachment region.

7. The tunnel gate of claim 1, wherein, when in the open orientation, the plurality of trigger bars extends from the trigger mount and breaks a plane formed by the entry opening.

8. The tunnel gate of claim 1, wherein the trigger stop assembly includes an open orientation trigger stop, which is configured to define the open orientation of the plurality of trigger bars, and a closed orientation trigger stop, which is configured to define the closed orientation of the plurality of trigger bars.

9. The tunnel gate of claim 8, wherein the open orientation trigger stop is spaced-apart from the closed orientation trigger stop.

10. The tunnel gate of claim 8, wherein the open orientation trigger stop is defined by a lower surface of an upper frame region of the gate frame, wherein the open orientation trigger stop is configured to contact the plurality of trigger bars to define the open orientation.

11. The tunnel gate of claim 8, wherein the closed orientation trigger stop is defined by a trigger stop protrusion that extends from the trigger mount.

12. The tunnel gate of claim 8, wherein the closed orientation trigger stop is configured to at least one of:
(i) contact the plurality of trigger bars to define the closed orientation;
(ii) contact a corresponding linear trigger bar region of each trigger bar of the plurality of trigger bars to define the closed orientation; and
(iii) contact a trigger bar joining region of an attached pair of trigger bars to define the closed orientation.

13. The tunnel gate of claim 1, wherein the tunnel gate further includes a pair of opposed-side access-restricting projections, that restricts access of the crabs to a region of the entry opening that extends between a pair of opposed-side frame regions of the gate frame, and adjacent trigger bars of the plurality of trigger bars.

14. A crab pot, comprising:
a pot frame that at least partially bounds a crab-retaining volume;
a tunnel region that extends from a tunnel entrance, which is proximate an external periphery of the pot frame, to a tunnel exit, which opens into the crab-retaining volume;
the tunnel gate of claim 1 positioned at the tunnel exit; and
a mesh material operatively attached to the pot frame, such that the mesh material at least partially bounds the crab-retaining volume.

15. The crab pot of claim 14, wherein the tunnel region includes a tunnel floor, and further wherein the tunnel floor extends at least substantially parallel to a lower floor of the crab pot.

16. A method of operating a tunnel gate of a crab pot, wherein the tunnel gate includes a gate frame that define an entry opening, a trigger mount positioned within an upper gate region of the tunnel gate, the trigger mount is spaced from and exterior to the gate frame, and a plurality of trigger bars pivotally attached to the trigger mount and extending toward a lower gate region of the tunnel gate, the trigger mount forming an axis of rotation for the plurality of trigger bars at least substantially parallel to the entry opening, the method comprising:

permitting individual rotation of the plurality of trigger bars relative to the gate frame and about a rotation axis that extends at least substantially parallel to the entry opening; and restricting rotation of the plurality of trigger bars, utilizing a trigger stop assembly of the tunnel gate that is positioned within the upper gate region, to between an open orientation, which permits entry of crabs into the crab pot via the entry opening, and a closed orientation, which restricts egress of the crabs from the crab pot via the entry opening;

wherein the method further includes at least one of:

(i) maintaining an open space between the plurality of trigger bars and the lower gate region throughout an entirety of a trigger bar angular range-of-motion defined between the open orientation and the closed orientation; and (ii) maintaining a spaced-apart relationship between the plurality of trigger bars and the lower gate region throughout the entirety of the trigger bar angular range-of-motion.

17. The method of claim 16, wherein the method further includes progressively extending the plurality of trigger bars through a plane formed by the entry opening as the plurality of trigger bars transitions from the closed orientation to the open orientation.

18. A tunnel gate for a crab pot, the tunnel gate comprising:

a gate frame that defines an entry opening that is sized to permit crabs to pass therethrough and enter the crab pot;

a trigger mount positioned within an upper gate region of the tunnel gate, the trigger mount is spaced from and on an exterior side of the entry opening;

a plurality of trigger bars pivotally attached to the trigger mount and extending toward a lower gate region of the tunnel gate, wherein the plurality of trigger bars is configured to rotate, relative to the gate frame, about a rotation axis that extends at least substantially parallel to the entry opening; and a trigger stop assembly positioned within the upper gate region, wherein the trigger stop assembly is configured to restrict rotation of the plurality of trigger bars about the rotation axis between an open orientation, which permits entry of the crabs into the crab pot via the entry opening, and a closed orientation, which restricts egress of the crabs from the crab pot via the entry opening;

wherein, when in the open orientation, each trigger bar of the plurality of trigger bars extends from the trigger mount at an upper end of the respective trigger bar, and a lower end of the respective trigger bar and breaks a plane formed by the entry opening.

19. The tunnel gate of claim 18, wherein, when in the closed orientation, the plurality of trigger bars is spaced-apart from a lower frame region of the gate frame.

* * * * *